Patented Sept. 2, 1941

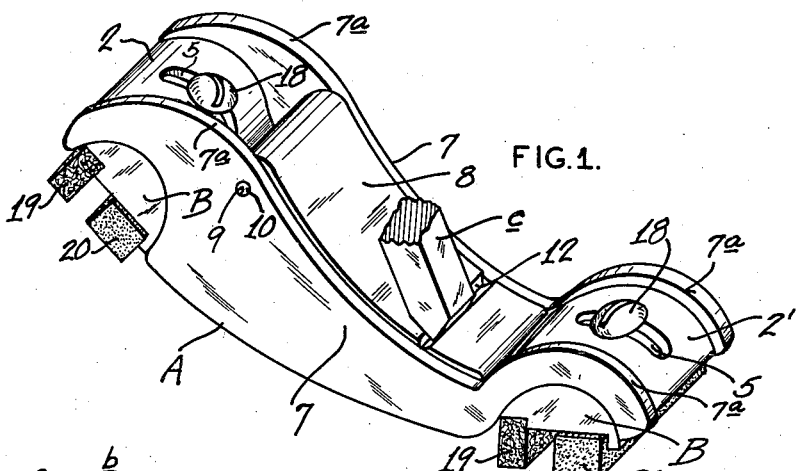
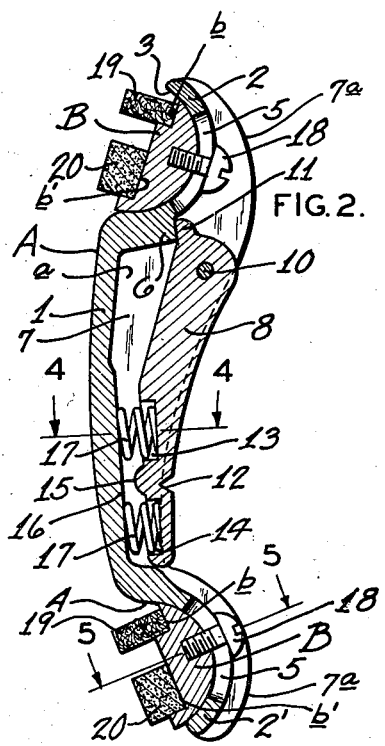
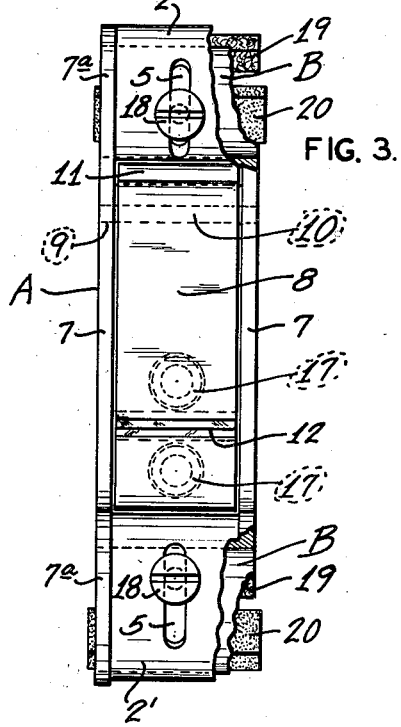
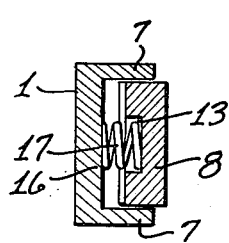
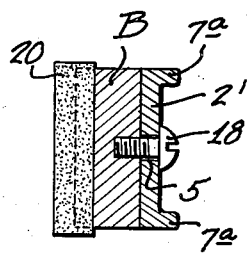
INVENTOR
HARRY B. BARRETT

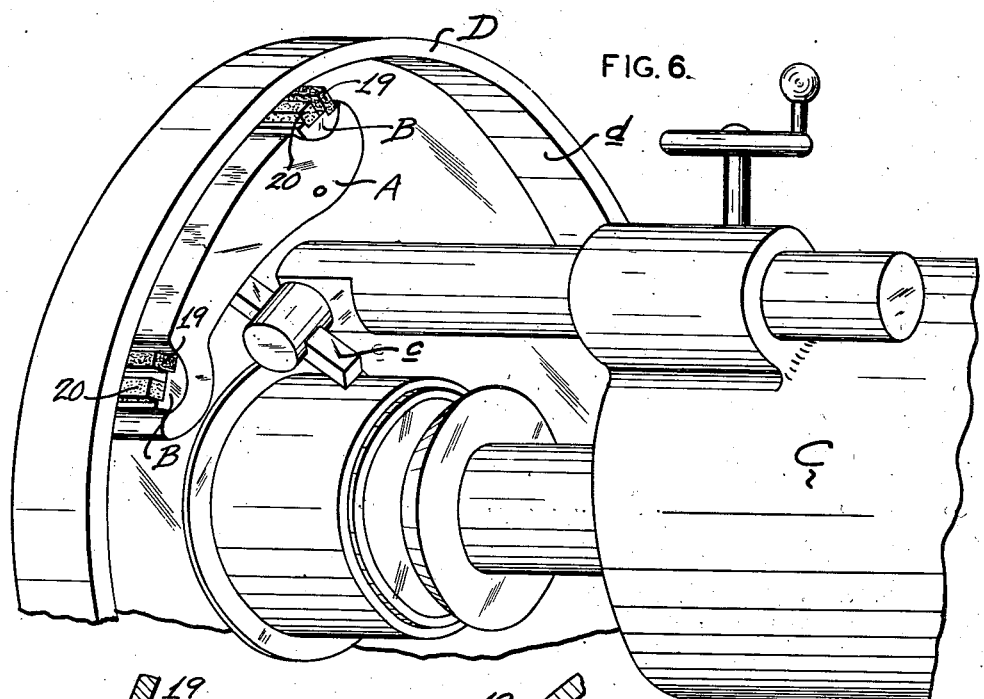
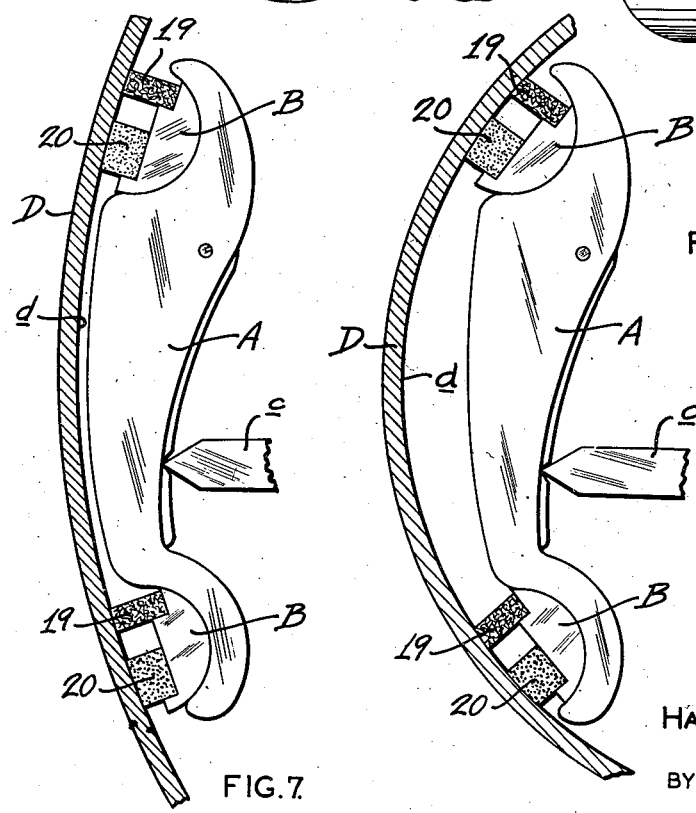

2,254,508

UNITED STATES PATENT OFFICE 2,254,508

HONING TOOL

Harry B. Barrett, St. Louis, Mo., assignor to Barrett Equipment Company, St. Louis, Mo., a corporation of Missouri Application August 14, 1939, Serial No. 290,039

12 Claims. (Cl. 51—204)

This invention relates generally to brake drum machining equipment and, more particularly, to a certain new and useful improvement in honing tools for smoothly finishing a machined drum-surface.

My invention has for its primary objects the provision of a tool of the class mentioned which is simple, rugged, and economical in construction, which is durable, precise, and accurate in use, which is conveniently adaptable and adjustable for employment with various types of drum lathes and to meet a wide range of drum diameters, and which is exceedingly efficient in quickly and speedily effecting an extremely smooth shoe-engaging face to and upon the particular drum.

And with the above and other objects in view, my invention resides in the novel features of form, construction, arrangement, and combination of parts presently described and pointed out in the claims.

In the accompanying drawings (2 sheets)—

Figure 1 is a perspective view of a honing tool constructed in accordance with and embodying my present invention;

Figure 2 is a longitudinal sectional view of the tool;

Figure 3 is a plan view of the tool;

Figures 4 and 5 are transverse sectional views of the tool, taken approximately along the lines 4—4, 5—5, respectively, Figure 2;

Figure 6 illustrates the tool in enlarged perspective in operative finishing or honing position in a brake drum; and Figures 7 and 8 are side elevational views of the tool, illustrating adjustments of the abrading carriers or blocks of the tool to meet different drum diameters.

Referring now in more detail and by reference characters to the drawings, which illustrate a preferred embodiment of the invention, the tool comprises a body-member A preferably integrally including a lengthwise somewhat arcuate or curved web 1 formed longitudinally at its opposite ends with opposed recessed or concavo-convex extensions 2, 2', providing hemi-cylindrical chambers or pockets 3, 4, facing outwardly toward the so-called under side of the web 1 and each extension 2, 2', having a longitudinally extending segmental slot 5 in its wall and the extension 2 being formed on its upper face with a shoulder-providing enlargement 6, all for purposes presently appearing and as best seen in Figure 2.

Along its opposite longitudinal margins, the web 1 is preferably integrally provided with upstanding flanges 7 having preferably the configuration best seen in Figure 1 and forming upon the upper face of the web 1 a longitudinally extending chamber, as at a, for accommodating a suitably elongated plate-like member 8 having the conformation in plan and section best seen in Figure 2, the flanges 7 being preferably re-enforcingly longitudinally extended, as at 7a, over and along the opposite margins of the recessed arcuate extensions 2, 2', as shown.

Adjacent the extension 2, the flanges 7 are provided transversely with registering openings, as at 9, for mounting the ends of a transverse pin 10 engaging the member 8 for securing the member 8 for hinged or swingable movement within the chamber a and over the web 1.

The member 8, as shown, is suitably sized and dimensioned for snugly fitting for limited swingable movement within the chamber a and is provided at its one or hinged end with a longitudinally projecting lip 11 for impinging engagement with the abutment shoulder 6.

At its other or free end, the member 8 terminates at approximately the base of the arcuate web-extension 2', and adjacent its said free end the member 8 is provided upon its outer or upper face with a transversely extending V-shaped recess, as at 12, and on its under face with preferably a pair of relatively shallow recesses 13, 14, presented toward the upper face of the web 1, the recesses or seats 13, 14, being disposed preferably equi-distantly on opposite sides of a transversely extending re-enforcing or strengthening rib 15 located directly under the recess 12, as best seen in Figure 2. Directly oppositte the seats 13, 14, the web 1 is thickened or re-enforced, as at 16, and seated in the recesses 13, 14, and impinging upon the thickened portion 16 of the web 1, as best seen in Figure 2, is a pair of relatively heavy compression springs 17 for normally yieldingly urging the free end of the member 8 outwardly and maintaining the lip 11 in impinging relation upon the shoulder 6, all as also best seen in Figure 2 and for purposes presently more fully appearing.

Seated for axial rotatory movement in the pockets 3, 4, are approximately hemi-cylindrical blocks B each threadedly provided with a retaining and adjustment member in the form of a headed screw 18 projecting radially through, and for movement in, its accommodating slot 5.

On its under or chordwise face, each block B is suitably provided, preferably as shown, with angular seats b, b', and adhesively or otherwise fixed in the respective seats b, b', and presented outwardly from the respective block or carrier B, are a brushing or cleaning member in the form preferably of a somewhat flexible felt-pad 19 and an abrading or honing bar 20 constructed of fine grained "carborundum" or other suitable abrasive material, all as best seen in Figures 2 and 5 and for purposes presently fully appearing.

In use and operation, the cutting bar or tool c, for example, of a drum lathe C is retracted and the honing tool manually disposed within the brake drum D with its abrading carriers B presented toward the face d of the drum D to be finished. The screws 18 are loosened and suitably shifted in the slots 5 for axially adjusting the blocks B so that the respective grinding faces of the honing bars 20 are brought approximately or substantially into flatwise engagement with the shoe-engaging drum-face d, the tool, as a whole, extending across the inner area of the drum D more or less in the segment of an arc. The lathe tool c is then adjustably shifted toward the drum-face d and into working engagement at its tip with the member 8 at its recess 12 and is advanced so as to force the free end of the member 8 slightly inwardly, thereby somewhat compressing the springs 17 and cushionwise maintaining the tool in operative working relation to the drum D, all as best seen in Figure 6.

The lathe C is now set in rotation in the conventional manner and works or shifts the tool both circumferentially and transversely over and across the drum-face d, which, by means of the so shifted bars 20 and brushes 19, is rapidly smoothly finished and cleaned.

As the honing or abrading operation proceeds, a certain amount of the metal of the drum D will be ground away and the diameter of the drum-face d accordingly increased. Such diametrical increase, however, is automatically compensated for by the springs 17, which yieldingly or elastically shift the body-member A and abrading-carriers B outwardly with respect to the member 8 and retain the honing blocks 20 in abrading relation to and against the drum-face d, adjustment of the tool to meet such working conditions being thus entirely eliminated.

As will be at once seen by reference to Figures 7 and 8, the tool may, by mere axial rotation of the carriers B, be adjusted to meet a very wide range of different drum diameters, and it will be quite apparent that the honing or abrading efficiency of the bars 20 is maintained by reason of the fact that the felt or cleaning pads 19 will continuously remove and clear away oil, dust, grease, and other foreign particles from the drum-face d being finished. With any reasonable and careful use, a set of honing bars 20 may be employed for effecting economically a great number of successive finishing operations, but, of course, a worn set of honing bars 20 may be very simply, quickly, and economically replaced and renewed by simply removing a screw 18 and substituting a new carrier B.

It will thus be clear that, by my present invention, there is provided a substantially universal honing tool, which may be quickly and readily adjusted to meet a wide range of different drum diameters, and which may be conveniently and simply employed with practically all standard types of drum lathes. Actual use has demonstrated that the tool will in an exceedingly short time remove all tool and chatter marks from, and produce a super finish upon, the particular drum-face d being worked.

It should be understood that changes and modifications in the form, construction, arrangement, and combination of the several parts of the tool may be made and substituted for those herein shown and described without departing from the nature and principle of my invention.

Having thus described my invention, what I claim and desire to secure by Letters Patent is:

1. A honing tool comprising a body-member having a longitudinal axis adapted to intercept a segmental arc of the brake drum when the tool is in place, abrading means including honing-bars disposed upon the body-member for rockable movement about an axis transverse to the longitudinal axis of the body-member for engagement upon the circumferential face of a brake drum, and means for yieldingly engaging said bars with the drum face, said engaging means including a member hingedly attached to and upon the body-member, and a coiled spring interposed between said member and the body-member.

2. A honing tool comprising a body-member having a web and parallel flanges projecting from the opposite margins of the web, abrading means including honing bars disposed upon the body-member for finishing movement upon the circumferential face of a brake drum, and means for engaging said bars with the drum face, said engaging means including a member disposed over said web and intermediate, and hingedly fastened at an end to, said flanges, and a coiled spring interposed between the web and the free end of said member.

3. A brake drum honing tool comprising a body-member having a hemi-cylindrical chamber, a block seated for axial rotatory adjustment in said chamber, and a honing bar carried by the block.

4. A honing tool comprising an elongated oblong-rectangular body-member having a hemi-cylindrical chamber and a longitudinally extending slot in the wall of said chamber, a hemi-cylindrical block seated for rotatory adjustment in said chamber, an adjustment member fixed to the block and shiftable in said slot, and an abrading bar carried by the block.

5. A honing tool comprising an elongated oblong-rectangular body-member having longitudinally spaced transversely disposed hemi-cylindrical chambers and respective longitudinally extending slots in the walls of said chambers, blocks seated for axial rotatory adjustment in the respective chambers, adjustment members extending radially from the blocks and shiftable in the respective slots, and abrading bars carried by the blocks.

6. A brake-drum honing tool adapted for use in co-operation with a drum-lathe, said tool comprising an elongated arcuate body-member, abrasive means adjustably mounted upon the body-member for optionally fitting brake-drums of different diameters, a lathe-tool receiving arm pivotally mounted on the body-member for limited swingable movement, and spring means for resiliently urging the arm away from the body-member.

7. A brake-drum honing tool adapted for use in co-operation with a drum-lathe, said tool comprising an elongated arcuate body-member, abrasive means adjustably mounted upon the body-member for optionally fitting brake-drums of different diameters, an arm pivotally mounted on the body-member for limited swingable movement, said arm being provided in its outwardly presented face with a slot for receiving the end of the drum-lathe tool, and spring means for resiliently urging the arm away from the body-member.

8. A honing tool comprising an elongated body-member having a plurality of transversely extending arcuate recesses, and a block rockably mounted in each recess and provided with upstanding abrasive and wiper members disposed in spaced parallel relation to each other.

9. A brake-drum honing tool for use with a drum-lathe comprising a body-member, abrasive means adjustably mounted upon the body-member for optionally fitting brake drums of different diameters, an arm pivotally mounted on the body-member for limited swingable movement and adapted for supporting the tool in the lathe, and spring means for resiliently urging the arm away from the body-member.

10. A brake-drum honing tool adapted for use in co-operation with a drum-lathe having a tool-holder, said tool comprising an elongated arcuate body-member, abrasive means adjustably mounted upon the body-member for optionally fitting brake drums of different diameters, an arm pivotally mounted on the body-member for limited swingable movement and adapted for engagement with the tool-holder, and spring means for resiliency urging the arm away from the body-member.

11. A honing tool comprising an elongated oblong-rectangular body-member having a hemi-cylindrical chamber, a block seated for axial rotatory adjustment in said chamber, and an abrading bar carried by the block and transversely disposed to the body-member.

12. A honing tool comprising an elongated oblong-rectangular body-member having longitudinally spaced transversely disposed hemi-cylindrical chambers and respective longitudinally extending slots in the walls of said chambers, blocks seated for axial rotatory adjustment in the respective chambers, adjustment members extending radially from the blocks and shiftable in the respective slots. abrading bars carried by the blocks, and means for yieldingly engaging said bars with the surface being honed.

HARRY B. BARRETT.